Jan. 20, 1970 A. F. L. ANDERSON ETAL Re. 26,776

LIQUID REFRIGERANT COOLING OF HERMETIC MOTORS

Original Filed Feb. 24, 1961

INVENTORS.

AXEL F. L. ANDERSON
PETER A. WELLER

BY

WILSON, SETTLE & CRAIG

ATTORNEYS

United States Patent Office

Re. 26,776
Reissued Jan. 20, 1970

26,776
LIQUID REFRIGERANT COOLING OF HERMETIC MOTORS

Axel F. L. Anderson, Clearwater, Fla., and Peter A. Weller, Farmington, Mich., assignors to American Radiator & Standard Sanitary Corporation, New York, N.Y., a corporation of Delaware Original No. 3,149,478, dated Sept. 22, 1964, Ser. No. 91,522, Feb. 24, 1961. Application for reissue May 2, 1966, Ser. No. 552,669
Int. Cl. H02k *9/08*
U.S. Cl. 310—57 11 Claims

Matter enclosed in heavy brackets [ ] appears in the original patent but forms no part of this reissue specification; matter printed in italics indicates the additions made by reissue.

This invention relates to a refrigerating system, and particularly to means for efficiently utilizing a portion of the system refrigerant to cool the system compressor motor.

One object of the present invention is to provide cooling means for an electric machine which distributes appreciable quantities of liquid refrigerant into the areas of highest potential temperature so that the machine can operate with a substantially higher electrical energy input or rating than would otherwise be possible.

A further object is to provide a refrigerating system wherein a relatively small size compressor motor can be utilized per given refrigerant capacity of the system.

A still further object of the invention is to provide a refrigerating system wherein oil for the compressor bearings is caused to be circulated without interference by the refrigerant and without any adverse effect on the cooling or operation of the compressor motor.

An additional object of the invention is to provide a refrigerating system having features of arrangement and construction as will minimize the number of costly control devices necessary to provide proper operation under various service conditions.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 4:
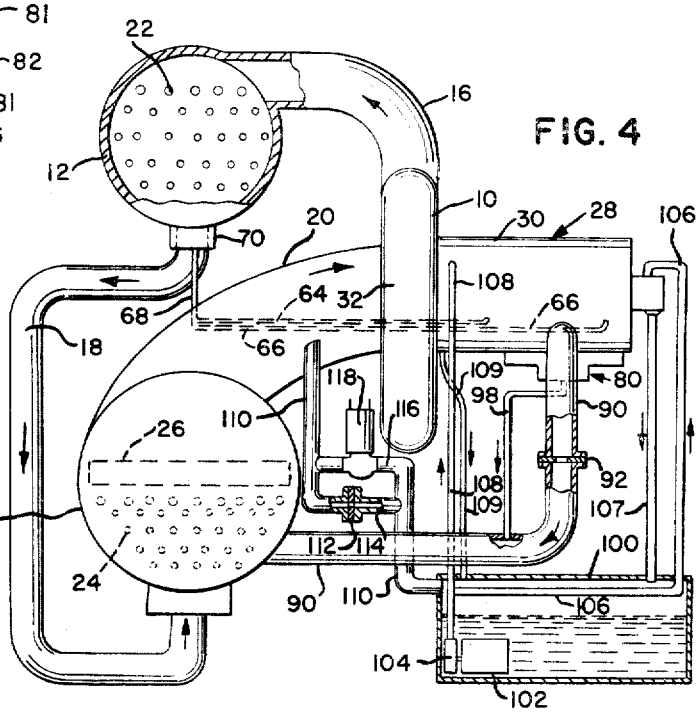
FIG. 4 is a semi-schematic illustration of a refrigerating system having a motor of invention incorporated therein.

Referring to the drawings, and particularly FIG. 4, there is shown a refrigerating machine comprising a conventional centrifugal refrigerant compressor 10, conventional refrigerant condenser 12, and conventional refrigerant evaporator 14. These various components are suitably interconnected by the piping at 16, 18 and 20 to provide for the circulation of a conventional refrigerant such as the usual fluorinated carbon compounds.

The compressor and evaporator are both of the tube-shell type wherein heat exchange tubes 22 and 24 extend longitudinally through the respective shells to direct a heat exchange fluid (such as water) into heat-transfer relation with the refrigerant. The heat exchange fluid will of course be cooled as it passes through the condenser tubes. A conventional eliminator 26 may be provided above the evaporator tubes.

Figure 1:
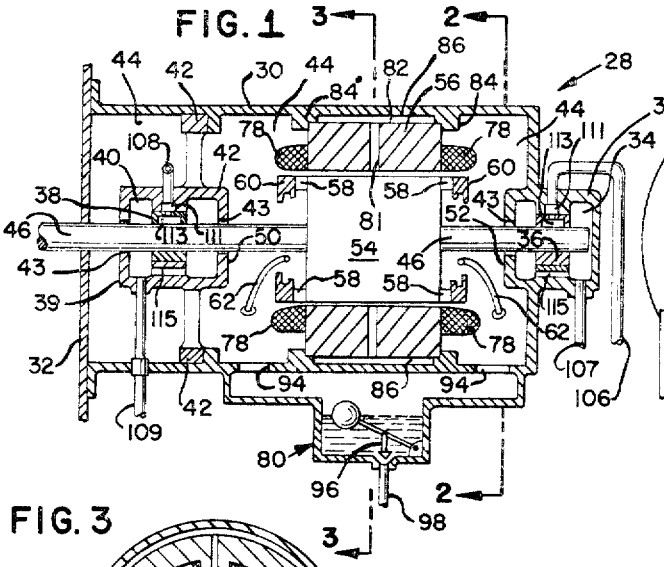
FIG. 1 is a longitudinal sectional view taken through an electric motor constructed according to the invention.

In the illustrated machine the compressor is driven by an electric motor 28 which, as shown in FIG. 1, may comprise a casing 30 directly connected with the back wall 32 of the compressor. One end of casing 30 is formed hollow as at 33, 52 to provide a relatively small chamber 34 for fixedly receiving the conventional oil film type motor shaft bearing 36. The other motor shaft bearing 38 is fixedly disposed within a second small chamber 40 defined by the hollow central portion 39, 50 of a spider-type insert 42. Each of the chamber structures 33, 34 and 39, 40 enjoys a slight clearance at 43 with motor shaft 46 so that refrigerant vapor from the interior spaces 44 of the motor is allowed to flow into the small chamber 34 and 40.

It will be understood that in practice, motor shaft 46 connects with the vaned impeller (not shown) within the compressor housing. As shown in FIG. 1, the motor shaft extends from a conventional rotor 54 located within a stator structure 56. The rotor is provided with circumferentially spaced bars 58 which extend axially from both ends of the rotor to mount two endless or annular refrigerant-distributing channel or trough structures 60. The arrangement is such that during rotation of rotor 54 the trough structures receive liquid refrigerant from nozzles 62 and direct same into the rotor-stator gap for cooling the areas thereof having the highest temperature potential.

The mechanism for delivering liquid refrigerant to the nozzles is shown in FIG. 4. As there shown, the arrangement comprises two liquid refrigerant lines 64 and 66, which extend from a common liquid line 68 depending from a trap chamber 70 located below a portion of condenser 12. By this arrangement a minor part (as for example one or two percent) of the liquid refrigerant issuing from the condenser is diverted into the two nozzles 62.

Figure 2:
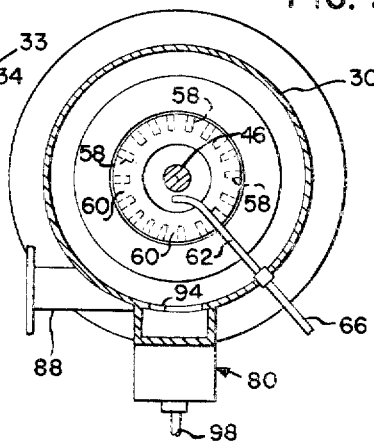
FIG. 2 is a sectional view on line 2—2 in FIG. 1.
Figure 5:
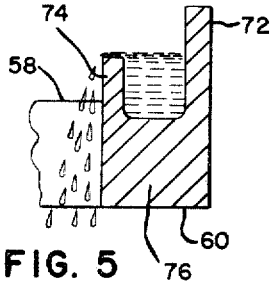
FIG. 5 is an enlarged fragmentary sectional view of a refrigerant-distributing ring structure utilized in the FIG. 1 motor.

As will be seen best in FIG. 2, each nozzle 62 discharges liquid refrigerant directly into its respective rotary trough structure, from whence the liquid is spilled or thrown outwardly by centrifugal action onto bars 58. The trough structures are of particular advantage in that they throw liquid refrigerant evenly around the entire motor periphery so that all peripheral points of the motor receive adequate coolant. The outer flange 72 (FIG. 5) of each trough structure preferably extends further radially inwardly from the web portion 76 than the inner flange 74 so that the liquid spills toward the bars 58 rather than toward the motor casing ends. Bars 58 serve to exert a centrifugal pump effect on the liquid so that the liquid is given a relatively high kinetic energy, even when the rotor is operating at relatively low speed. The high kinetic energy condition is advantageous in that it enables the liquid refrigerant to move rapidly into the rotor-stator gap after striking the end portions of the stator windings 78, thus being able to penetrate into the gap before being entirely vaporized. Spaces 44 at the ends of the motor casing are isolated from the evaporator and compressor inlets by means of the liquid trap 80. Therefore the evaporator or compressor suction is not effective to act on spaces 44. However, as will be apparent hereinafter, in the illustrated embodiment the evaporator suction is effective on the rotor-stator gap so as to draw refrigerant therethrough. The confinement of the suction action to the rotor-stator gap is advantageous in that the gap-forming surfaces are ensured of receiving adequate quantities of refrigerant.

Figure 3:
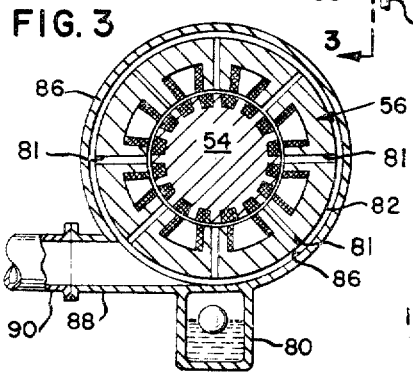
FIG. 3 is a sectional view on line 3—3 in FIG. 1.

To establish communication between the evaporator and rotor-stator gap the stator is provided with a plurality of radial passages 81 which extend from the gap to the stator outer peripheral surface 82 (FIG. 3). As best shown in FIG. 1, peripheral surface 82 is spaced inwardly from the inner surface of casing 30 by spacers 84 so as to provide an annular passage 86 (FIG. 3). A duct-forming extension 88 is provided on the motor casing to convey the substantially vaporized refrigerant into a duct 90 which extends over to the evaporator 14 (FIG. 4). On a weight basis the flow rate of refrigerant through duct 90 is relatively small, and the effect of the duct 90 refrigerant on the efficiency of the evaporator is not appreciable. If desired duct 90 can be extended to duct 20 instead of to the evaporator.

As shown in FIG. 4, duct 90 is provided with an orifice plate 92. The size of the orifice in plate 90 is so chosen that the refrigerant pressure in spaces 44 (FIG. 1) is slightly above the lubricant pressure in chambers 34 and 40. In this way a small amount of refrigerant is caused to flow from spaces 44 into chambers 34 and 40 to thus prevent leakage and accumulation of lubricant in the motor.

In operation of the system preferably somewhat more than the theoretical amount of refrigerant necessary to cool the motor is fed through ducts 64 and 66 to insure a fully adequate amount of refrigerant and the prevention of local hot spots. There is thus some liquid refrigerant which is not vaporized, particularly at the end spaces 44 of the motor where the temperatures are relatively low. The unvaporized refrigerant drains from spaces 44 through openings 94 into trap chamber 80 where it collects due to the action of the conventional float valve means 96. It is returned to the system via a duct 98 which may connect with duct 90 as shown in FIG. 4 or other suitable point in the system, as for example the evaporator.

Referring now to the lubricant system, there is shown a lubricant storage tank 100 having a submerged electric motor 102 therein in operative driving engagement with a lubricant pump 104. The output from the pump is directed into two lines 106 and 108 which connect with distributor channels 111 in the two enlarged wall structures 33 and 39. These channels in turn connect with suitable lubricant slots 113 formed in the bearing surfaces of bearings 36 and 38. During operation of the system the lubricant is fed to the bearing surfaces via slots 113 and is then exhausted into chambers 34 and 40. Lubricant return lines 107 and 109 connect chambers 34 and 40 with tank 100. Small passages are provided at 115 to permit the areas of chambers 34 and 40 remote from lines 107 and 109 to communicate with said lines, thus enabling all of the drain off lubricant to reach tank 100 without establishing an undesirably high back pressure adjacent one end of each bearing.

As previously noted, the refrigerant pressure in spaces 44 is maintained slightly above the oil pressure in chambers 34 and 40 (by orifice plate 92). Hence the return lines 107 and 109 contain a lubricant-refrigerant mixture. The returning lubricant is heated due to the friction developed on the motor shaft, and the lubricant-entrained refrigerant is in most cases in a vapor state as it enters tank 100. If it is not completely vaporized a small heater (not shown) may be utilized to vaporize it so that it may be separated from the lubricant and returned to the refrigerant circulating portion of the system.

In the illustrated embodiment the vaporized refrigerant is vented from tank 100 back to the system through a vent line or conduit means 110. As shown in FIG. 4, line 110 is divided into two branches 114 and 116. Branch 116 contains a solenoid valve 118 which is normally closed during operation of the system. Branch 114 contains an orifice plate 112 which is sized to restrict refrigerant flow sufficiently to maintain sump pressure high enough to prevent cavitation of pump 104.

The solenoid for valve 118 is preferably connected to the electrical supply so that when the system is shut down the valve 118 is opened to pass large quantities of refrigerant from the tank to duct 20. This action is necessary because at shut down the pressure in spaces 44 drops more rapidly than the pressure in tank 100; unless the rate of venting were increased during this time there would be a pressure reversal action wherein oil would gush through clearances 43 into spaces 44. The use of a branch line 116 and solenoid valve 118 is one way in which to provide the desired venting feature. Other arrangements can of course be utilized to achieve the necessary increase in the cross sectional area of the vent line at shut down.

In summary, the operation of the system involves circulating the major amount of refrigerant between compressor 10, condenser 12 and evaporator 14. A minor amount of the liquid refrigerant (as for example one or two percent) is diverted from the condenser into lines 64 and 66, from where it is fed through the motor. Some of this refrigerant is exhausted in a vapor state into duct 90 via fitting 88, and some is drained into chamber 80 as a liquid. A very small part of the motor refrigerant vapor seeps into chambers 34 and 40 and eventually is returned to the main refrigerant stream via the vent line 110. The lubricant is continuously directed from and to tank 100 by the pump 104.

As used herein the term motor is to be construed as an electric machine having a rotor and stator separated by an annular gap.

It will be understood that the invention comprehends features of improvement in the system as an entirety and in the construction of certain components therein, particularly the means for circulating refrigerant through the motor and maintaining the desired relation thereof with the lubricant. Various minor changes may of course be made in the system and components while still practicing the invention as set forth in the appended claims.

We claim:

1. The combination comprising a refrigerating system including a refrigerant compressor, condenser and evaporator arranged in series flow relationship; an electric motor for operating said compressor, including a motor casing, a stator within the casing, a rotor within the stator, a shaft for said rotor, and bearings adjacent each end of the casing for rotatably supporting the rotor shaft; an endless liquid refrigerant trough carried exteriorly on one end of the rotor for distributing refrigerant into the rotor-stator gap; a liquid refrigerant supply tube extending through the casing to supply liquid refrigerant to said trough; first duct means extending from the rotor-stator gap to direct refrigerant back to the refrigerant system; liquid trap chamber means arranged to receive liquid refrigerant from the motor casing spaces adjacent the troughs; second duct means extending from the trap chamber means to return liquid refrigerant to the system; lubricant circulating means for supplying each of the rotor shaft bearings with lubricant; and separator means for returning any vaporized refrigerant which may leak into the bearings back to the refrigerating system.

2. The combination comprising a refrigerating system including a refrigerant compressor; an electric motor for operating said compressor including a casing, a stator within said casing, and a rotor within said stator; means for diverting refrigerant in a liquid condition from the system and feeding same into the casing and thence into the rotor-stator gap; and means for drawing refrigerant from the casing and returning same to the system; said drawing and returning means comprising a suction line communicating with the gap and a liquid trap arranged to receive liquid refrigerant from the spaces within the casing located outside the rotor-stator gap so as to form a liquid seal for thereby causing the suction of the line to be applied exclusively to the gap.

3. In an electric machine having a stator and a rotor separated by an annular gap, a ring carried by the rotor at one end thereof, said ring having a groove on the interior periphery thereof, said groove being defined by internal and external lips with the internal lip positioned adjacent the rotor and formed shorter than the external lip, means for directing a stream of liquid refrigerant tangentially into said groove, whereby rotation of the rotor and attached ring causes the liquid refrigerant to fill the ring uniformly by centrifugal force and overflow said internal lip uniformly around the rotor and be thrown against the stator and into the rotor-stator gap, and means for exhausting refrigerant from the machine.

4. The combination comprising an electric machine having a rotor and a surrounding stator separated by an annular gap, said rotor carrying ring means on one end thereof, said ring means having an annular groove, the mouth of the groove facing radially inwardly for receiving, retaining and throwing radially outwardly the excess portion of liquid refrigerant which spills therefrom into the end of the rotor-stator gap by centrifugal action during machine operation, means for supplying liquid refrigerant to the groove during machine operation, and means for exhausting refrigerant from the machine.

5. The combination comprising an electric machine having a rotor and a surrounding stator separated by an annular gap, a series of circumferentially spaced fan blades carried on an end of the rotor, a ring structure defining an annular channel carried adjacent the fan blades with the mouth thereof facing the rotor axis, said channel having two spaced flanges defining side walls, one flange adjacent the rotor and the other way from the rotor, the flange of said channel located away from the rotor extending further toward the rotor axis than the other flange so that liquid refrigerant placed in the channel will spill over said other flange and into the fan blades, to thus be directed into the rotor-stator gap, means to supply liquid refrigerant to the channel, and means for exhausting refrigerant from the machine.

6. In an electric machine having a rotor and a surrounding stator separated by an annular gap, ring means carried on each end of the rotor, said ring means having an annular groove, the mouth of the groove facing radially inwardly for receiving, retaining and throwing radially outwardly the excess portion of liquid refrigerant which spills therefrom into the ends of the rotor-stator gap by centrifugal action during machine operation, means for supplying liquid refrigerant to each groove, and means for withdrawing vaporized refrigerant from the rotor-stator gap at a point between the ends thereof.

7. In an electric machine having a stator and a rotor separated by an annular gap, ring means on one end of the rotor, said ring means being spaced from the end of said rotor, said ring means having an annular groove, the mouth of the groove facing radially inwardly for receiving, retaining and throwing radially outwardly the excess portion of liquid refrigerant which spills therefrom into the end of said ring-rotor space by centrifugal action during machine operation, means for directing liquid refrigerant into said groove in filling relation, and means for exhausting refrigerant from the machine.

8. In a refrigerant system, a refrigerant compressor, condenser and evaporator connected in operable relation, a motor connectde in driving relation to said compressor, said motor having a rotor and a stator separated by an annular gap, ring means carried by said rotor in spaced coaxial relation adjacent one end thereof with an air space between the ring means and the rotor end, said ring means having a groove on the inner periphery thereof, the mouth of the groove facing radially inwardly for receiving, retaining and throwing radially outwardly the excess portion of liquid refrigerant which spills therefrom into the end of said gap through said air space by centrifugal action during machine operation, conduit means for conducting liquid refrigerant from said condenser and extending into said motor to fill said groove with liquid refrigreant and a refrigerant exhaust conduit extending from a median portion of said gap and connected in fluid flow relation to the inlet side of the compressor.

9. In an electric machine having a rotor and a stator separated by an annular gap and with the stator winding extending beyond the end of the rotor, ring means carried adjacent one end of the rotor and rotatable therewith, said ring means having an annular groove, the mouth of the groove facing radially inwardly for receiving, retaining and throwing radially outwardly the excess portion of liquid refrigerant which spills therefrom into the end of the rotor-stator gap by centrifugal action during machine operation, means for filling said groove with liquid refrigerant, a radial passage through a medial portion of the stator, and means for withdrawing spent refrigerant from the gap through said radial passage.

10. In an electric machine having a rotor and stator separated by an annular gap, a plurality of circumferentially spaced fan blades projecting from at least one end of the rotor, ring means carried adjacent said blades, said ring means being spaced from the end of the rotor by said blades and rotatable with the rotor, said ring means having an annular groove the mouth of which faces the rotor axis, said groove being defined by two spaced walls, one located away from the blades and one adjacent the blades, the wall away from the blades extending further toward the rotor axis than the other wall so that liquid refrigerant placed within the groove will spill over the other wall and into the blades to be directed by centrifugal action into the end of the rotor-stator gap, means for filling said groove with liquid refrigerant, and means for exhausting refrigerant from the machine.

*11. The combination comprising an electric machine having a rotor and a surrounding stator separated by an annular gap; ring means carried by the rotor and defining a continuous annular groove, the mouth of the groove facing radially inwardly; means for feeding liquid refrigerant into the mouth of the groove during machine operation, whereby a liquid ring of spinning refrigerant is retained in the groove; the interior surfaces of the groove being imperforate so that continued introduction of liquid into the groove fills said groove and then causes an even annular spray of refrigerant to overflow radially outwardly against end portions of the stator, said stator end portions constituting end portions of the stator windings; and means for exhausting refrigerant from the machine.*

References Cited

The following references, cited by the Examiner, are of record in the patented file of this patent or the original patent.

UNITED STATES PATENTS

| | | | |
|---|---|---|---|
| Re. 24,802 | 5/1960 | Kocher et al. | 62—475 |
| 2,031,080 | 2/1936 | Van Denventer | 198—220 |
| 2,096,297 | 10/1937 | Goldner et al. | 62—455 |
| 2,780,738 | 2/1957 | Else | 310—54 |
| 3,088,042 | 4/1963 | Robinson | 310—54 |

FOREIGN PATENTS

| | | |
|---|---|---|
| 1,232,820 | 4/1960 | France. |

MILTON O. HIRSHFIELD, Primary Examiner

L. L. SMITH, Assistant Examiner

U.S. Cl. X.R.

310—64